Nov. 16, 1943.   J. ARMSTRONG   2,334,533
DEVICE FOR BREWING AND DISPENSING BEVERAGES
Filed May 7, 1943
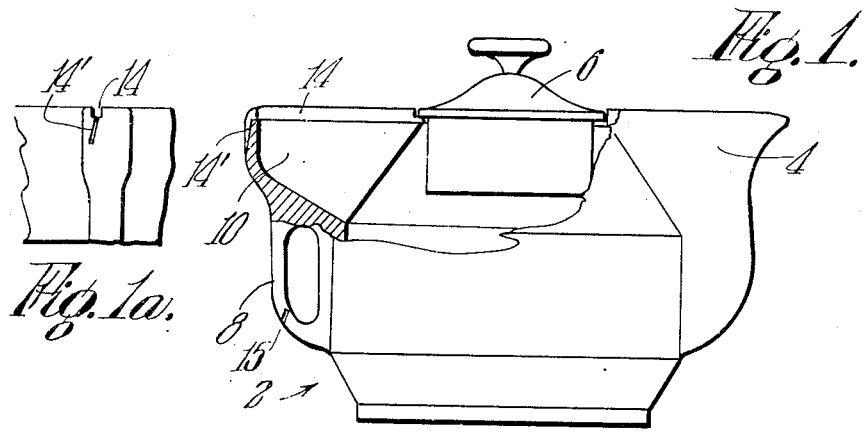
Fig. 1.
Fig. 1a.
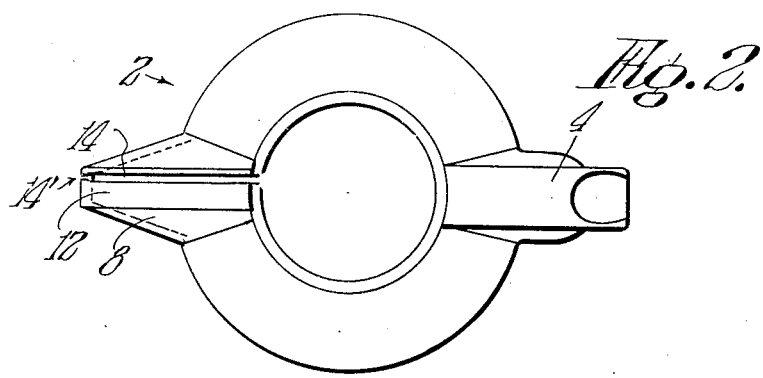
Fig. 2.
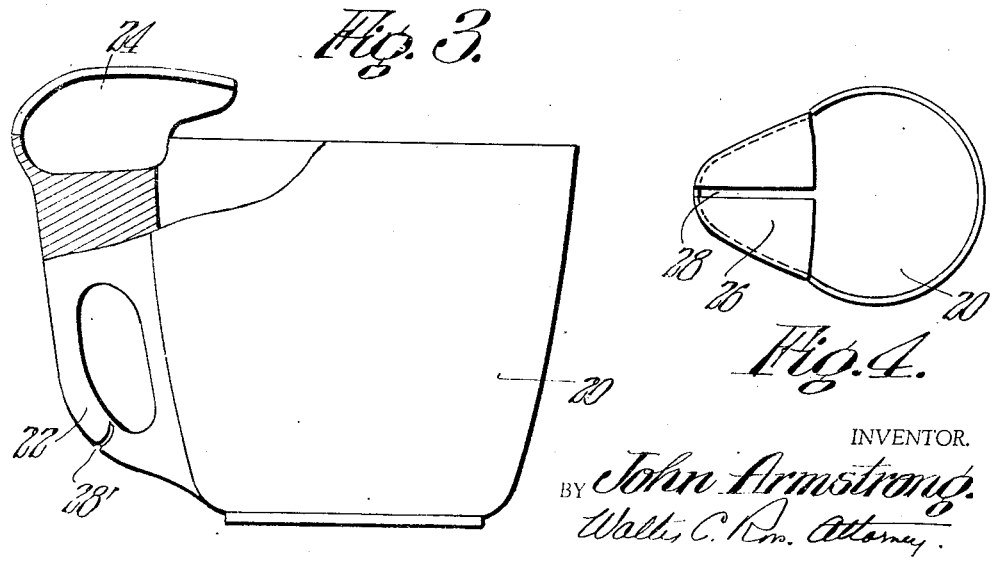
Fig. 3.
Fig. 4.
INVENTOR.
BY John Armstrong
Wallis C. Rose, Attorney.

Patented Nov. 16, 1943

2,334,533

UNITED STATES PATENT OFFICE 2,334,533

DEVICE FOR BREWING AND DISPENSING BEVERAGES

John Armstrong, Bayonne, N. J.

Application May 7, 1943, Serial No. 485,974

3 Claims. (Cl. 99—295)

This invention relates to improvements in receptacle devices for brewing and dispensing beverages such as tea or the like.

The principal objects of the invention are directed to the provision of a device for brewing and dispensing beverages such as tea or the like and in a general way includes a main receptacle having a handle in which is a chamber opening into the main receptacle with means permitting the passage of the retriever of a tea ball or the like therethrough so that the brewing material such as a tea bag may be transferred back and forth between the main receptacle and chamber.

Various novel objects and advantages will be understood from the following description of the present preferred form of the invention in connection with the drawing, wherein:

Fig. 1 is a side elevational view of a teapot embodying the novel features of the invention;

Fig. 1a is a partial end elevational view of the handle of the device shown in Fig. 1;

Fig. 2 is a plan view of the teapot shown in Fig. 1;

Fig. 3 is a side elevational view of a cup embodying the novel features of the invention; and Fig. 4 is a plan view at a smaller scale of the cup in Fig. 3.

Referring now to the drawing in detail, the novel features of the invention will be fully explained.

A teapot 2 in Figs. 1 and 2 has a main receptacle from which leads a pouring spout 4. A cover 6 is provided for the open upper side of the receptacle as shown in Fig. 1. The cover is omitted in Fig. 2.

A handle 8 is provided at one side of the teapot 2 that has a chamber 10 opening into the main receptacle thereof. An upper wall 12 of the chamber 10 is slotted more or less radially at 14 to receive the retriever of a tea ball or the like. Extending from the slot 14 in the outer face of the handle there is a restricted slot 14' that is adapted to receive and frictionally engage a retriever and releasably hold it.

In use the receptacle 2 may contain a hot liquid such as water and a tea ball may be placed in the water for the brewing operation with the retriever or string thereof extending through slot 14 so that its free end is accessible for manual engagement.

The retriever may be grasped manually so that the tea ball may be transferred back and forth between the main receptacle and chamber as may be desired. When it is desired to retain the tea ball in the chamber 10 the retriever may be inserted into the restricted slot 14' where it will be frictionally engaged and held but is readily removable therefrom when it is desired to transfer the tea ball.

In the modification of the invention shown in Figs. 3 and 4 a receptacle 20 in the form of a cup is provided which has a handle 22. The handle is formed with a chamber 24 which opens into the main receptacle at the upper side thereof. An upper wall 26 of the chamber 24 is provided with a slot 28 for a retriever of a tea bag or the like.

A tea bag may have its retriever or string passing through the slot 28 so that by manual engagement thereof the bag may at will be transferred from the receptacle to the chamber and vice versa.

A slot 28' for releasably receiving the retriever of the tea bag may be located anywhere in the handle so that with the bag in the chamber and the retriever extending through slot 28 the end portion may be anchored in slot 28' to prevent the bag from displacement from the chamber.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A device for brewing and dispensing beverages comprising in combination, a receptacle having a handle at a side thereof, said handle provided with a chamber opening into the receptacle having an upper wall provided with a slot for a retriever, all adapted and arranged whereby the retriever of a beverage bag may extend through said slot for manual engagement outside the device to transfer said bag between the receptacle and chamber.

2. A device for brewing and dispensing beverages comprising in combination, a receptacle having an open upper side and a handle at a side thereof, said handle provided with a chamber opening into the receptacle adjacent the open upper side thereof and having an upper wall provided with a slot for a retriever, all adapted and arranged whereby the retriever of a beverage bag may extend through said slot for manual engagement outside the device to transfer said bag between the receptacle and chamber.

3. A device for brewing and dispensing beverages comprising in combination, a receptacle having a handle at a side thereof, said handle provided with a chamber opening into the receptacle having an upper wall provided with a retriever slot and a restricted slot leading therefrom, all adapted and arranged whereby the retriever of a beverage bag may extend through said slot for manual engagement outside said device to transfer said bag between the receptacle and chamber, and said restricted slot to receive and frictionally engage a retriever to releasably hold the same.

JOHN ARMSTRONG.